(12) United States Patent
Maruyama et al.

(10) Patent No.: US 9,354,443 B2
(45) Date of Patent: May 31, 2016

(54) OPTICAL SCANNING DEVICE AND OPTICAL SCANNING UNIT

(71) Applicants: Yuki Maruyama, Tokyo (JP); Misato Abe, Tokyo (JP)

(72) Inventors: Yuki Maruyama, Tokyo (JP); Misato Abe, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/454,856

(22) Filed: Aug. 8, 2014

(65) Prior Publication Data
US 2015/0055203 A1 Feb. 26, 2015

(30) Foreign Application Priority Data

Aug. 23, 2013 (JP) ................................. 2013-173553

(51) Int. Cl.
*G02B 26/08* (2006.01)
*G02B 26/10* (2006.01)

(52) U.S. Cl.
CPC .......... *G02B 26/105* (2013.01); *G02B 26/0858* (2013.01)

(58) Field of Classification Search
CPC .. G02B 26/08; G02B 26/085; G02B 26/0833; G02B 26/0841
USPC ............................ 359/223.1–226.1, 290, 291
See application file for complete search history.

(56) References Cited

U.S. PATENT DOCUMENTS 6,781,732 B2 * 8/2004 Cho ...................... B81B 3/0021
359/224.1

FOREIGN PATENT DOCUMENTS

JP      2006-220903      8/2006
WO    WO 2009/069009    * 6/2009 ............. G01N 21/55

* cited by examiner

*Primary Examiner* — Euncha Cherry
(74) *Attorney, Agent, or Firm* — Ipusa, PLLC (57) ABSTRACT

An optical scanning device includes a mirror that oscillates to scan incident visible light. The mirror includes a substrate, a metal film formed on the substrate, and an reflection enhancing film stacked on the metal film.

17 Claims, 10 Drawing Sheets

OPTICAL SCANNING DEVICE AND OPTICAL SCANNING UNIT

CROSS-REFERENCE TO RELATED APPLICATION

The present application is based upon and claims the benefit of priority of Japanese Patent Application No. 2013-173553, filed on Aug. 23, 2013, the entire contents of which are incorporated herein by reference.

BACKGROUND OF THE INVENTION

1. Field of the Invention

An aspect of this disclosure relates to an optical scanning device and an optical scanning unit.

2. Description of the Related Art

A fixed (immobile) mirror used, for example, for a projector with a light source emitting a laser beam in a visible light range of 400-700 nm is typically produced by forming a metal film on a substrate of, for example, quartz or glass and forming a dielectric multilayer film composed of a low-refractive index film and a high-refractive index film on the metal film, to achieve a high reflectance. Japanese Laid-Open Patent Publication No. 2006-220903, for example, discloses a mirror including a substrate and a multilayer film composed of nine or more layers. The multilayer film includes a metal film formed on the substrate, and a dielectric multilayer film formed by stacking a low-refractive index film and a high-refractive index film alternately on the metal film.

Here, because the incident angle of incident light on such a fixed mirror is constant, the incident angle dependence of reflectance is not considered in determining the film configuration of the fixed mirror.

On the other hand, a mirror for an optical scanning device is used at various incident angles (e.g., about 0 through 50 degrees) in relation to the position of a light source, and the mirror itself oscillates (e.g., about ±10 degrees). Therefore, the film configuration of a mirror for an optical scanning device needs to be determined such that a high reflectance greater than a predetermined value can be achieved even when the incident angle changes.

Also, because a relatively thick (e.g., several mm) substrate can be used for a fixed mirror, the substrate is hardly deformed even when the total thickness of films formed on the substrate is large. That is, even when the number of stacked films is increased and the total thickness of the films increases, it does not cause a great problem. Accordingly, for a fixed mirror, no research is being made to reduce the number of stacked films and thereby reduce the total thickness.

On the other hand, because a mirror for an optical scanning device oscillates, a relatively thin (e.g., about several tens to several hundred μm) substrate needs to be used for the mirror. When the number of films stacked on a relatively thin substrate increases and the total thickness of the films increases, the substrate may be deformed. Therefore, in the case of a mirror for an optical scanning device, it is preferable to reduce the number of films stacked on a substrate and thereby reduce the total thickness of the films.

SUMMARY OF THE INVENTION

According to an aspect of this disclosure, there is provided an optical scanning device including a mirror that oscillates to scan incident visible light. The mirror includes a substrate, a metal film formed on the substrate, and an reflection enhancing film stacked on the metal film.

DESCRIPTION OF THE PREFERRED EMBODIMENTS

Preferred embodiments of the present invention are described below with reference to the accompanying drawings. Throughout the accompanying drawings, the same reference numbers are used for the same components, and overlapping descriptions of those components may be omitted.

Figure 1:
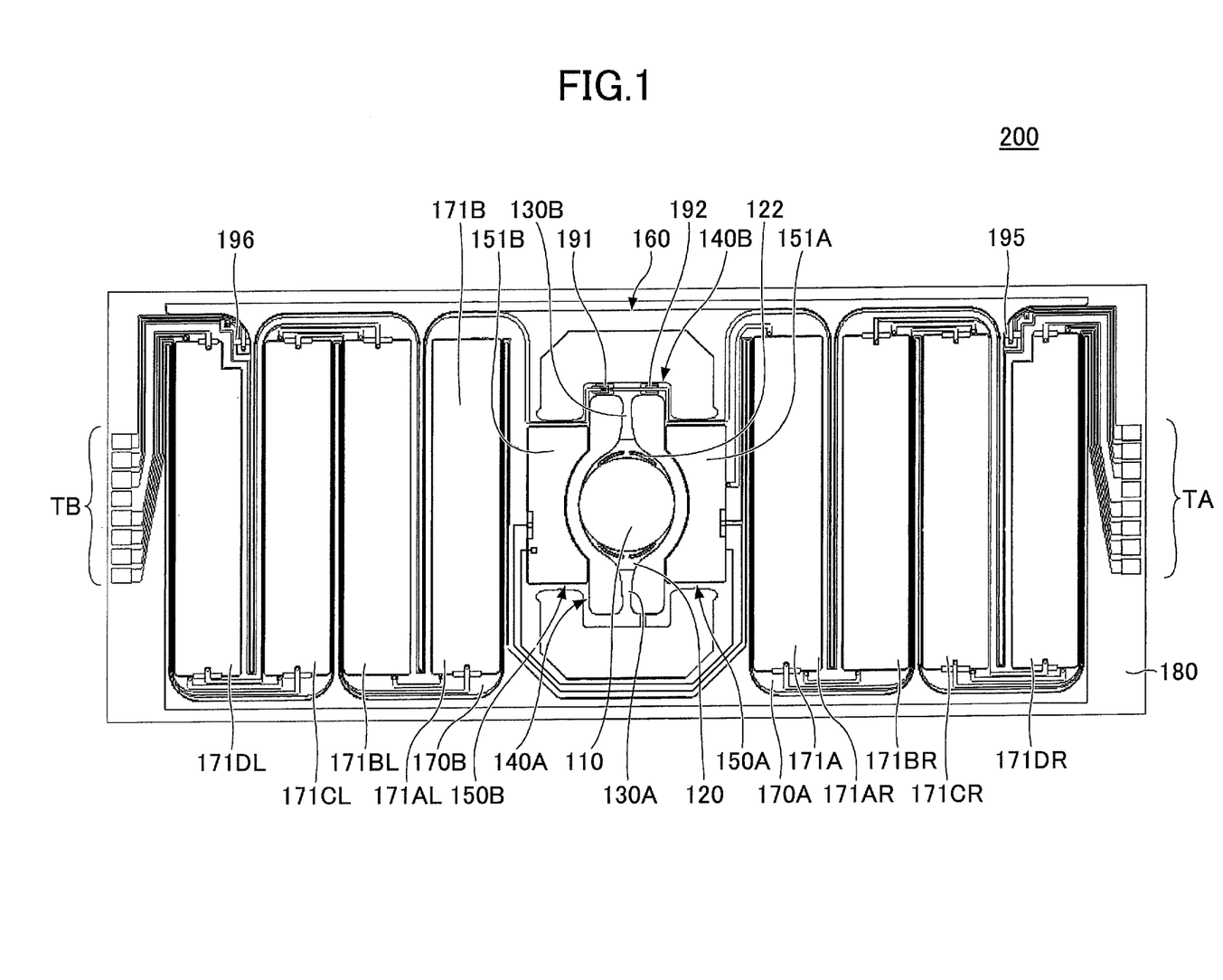
FIG. 1 is a drawing illustrating an exemplary configuration of an optical scanning device according to an embodiment.

FIG. 1 is a drawing illustrating an exemplary configuration of an optical scanning device 200 according to an embodiment. The optical scanning device 200 scans light emitted from a light source such as a laser and is, for example, a Micro Electro Mechanical System (MEMS) mirror where a mirror is driven by a piezoelectric element.

The optical scanning device 200 may include a mirror 110, a mirror support 120, torsion beams 130A and 130B, coupling beams 140A and 140B, first driving beams 150A and 150B, a movable frame 160, second driving beams 170A and 170B, and a fixed frame 180. The first driving beams 150A and 150B include driving sources 151A and 151B, respectively. The second driving beams 170A and 170B include driving sources 171A and 171B, respectively. The first driving beams 150A and 150B and the second driving beams 170A and 170B function as an actuator for causing the mirror 110 to oscillate vertically or horizontally (or in both directions) to scan a laser beam.

A slit 122 is formed in the mirror support 120 along the circumference of the mirror 110. The slit 122 reduces the weight of the mirror support 120 and enables the mirror support 120 to transmit torsion of the torsion beams 130A and 130B to the mirror 110.

In the optical scanning device 200, the mirror 110 is supported on a surface of the mirror support 120, and the mirror support 120 is connected to ends of the torsion beams 130A and 130B at the corresponding sides of the mirror support 120. The torsion beams 30A and 130B form an oscillation shaft extending in an axial direction and support the mirror support 120 from both sides of the axial direction. When the torsion beams 130A and 130B are twisted, the mirror 110 supported by the mirror support 120 oscillates and scans reflected light of light emitted toward the mirror 110. The torsion beams 130A and 130B are connected, respectively, to the coupling beams 140A and 140B and are thereby coupled to the first driving beams 150A and 150B.

The first driving beams 150A and 150B, the coupling beams 140A and 140B, the torsion beams 130A and 130B, the mirror support 120, and the mirror 110 are surrounded by the movable frame 160. One side of each of the first driving beams 150A and 150B is supported by the movable frame 160. Another side of the first driving beam 150A extends toward the inner side and is connected to the coupling beams 140A and 140B. Similarly, another side of the first driving beam 150B extends toward the inner side and is connected to the coupling beams 140A and 140B.

Pairs of the first driving beams 150A and 150B extending in a direction orthogonal to the torsion beams 130A and 130B are provided to sandwich the mirror 110 and the mirror support 120. The driving sources 151A and 151B are formed, respectively, on the surfaces of the first driving beams 150A and 150B. Each of the driving sources 151A and 151B includes an upper electrode formed on an upper surface of a thin film of a piezoelectric element on the corresponding one of the first driving beams 150A and 150B and a lower electrode formed on a lower surface of the piezoelectric element. The driving sources 151A and 151B expand and contract depending on the polarity of a driving voltage applied to the upper electrode and the lower electrode.

Accordingly, when driving voltages with different phases are alternately applied to the first driving beam 150A and the first driving beam 150B, the first driving beam 150A and the first driving beam 150B located on the left and right sides of the mirror 110 alternately oscillate in opposite vertical directions and cause the mirror 110 to oscillate around an oscillation axis or a rotational axis that is defined by the torsion beams 130A and 130B. Hereafter, the direction in which the mirror 110 oscillates around the axis of the torsion beams 130A and 130B is referred to as a "horizontal direction". For example, resonant oscillation is used for horizontal driving by the first driving beams 150A and 150B. This configuration makes it possible to cause the mirror 110 to oscillate at high speed.

One end of each of the second driving beams 170A and 170B is connected to an outer side of the movable frame 160. Pairs of the second driving beams 170A and 170B are provided to sandwich the movable frame 160 from right and left sides. A beam of the second driving beam 170A extending parallel to the first driving beam 150A is connected to an adjacent beam, and has a zigzag shape as a whole. Another end of the second driving beam 170A is connected to an inner side of the fixed frame 180. Similarly, a beam of the second driving beam 170B extending parallel to the first driving beam 150B is connected to an adjacent beam, and has a zigzag shape as a whole. Another end of the second driving beam 170B is connected to an inner side of the fixed frame 180.

On the surfaces of the second driving beams 170A and 170B, the driving sources 171A and 171B are formed in rectangular units that do not include curved sections. The driving source 171A includes an upper electrode formed on an upper surface of a thin film of a piezoelectric element on the second driving beam 170A and a lower electrode formed on a lower surface of the piezoelectric element. The driving source 171B includes an upper electrode formed on an upper surface of a thin film of a piezoelectric element on the second driving beam 170B and a lower electrode formed on a lower surface of the piezoelectric element.

In the second driving beams 170A and 170B, driving voltages with different polarities are applied to adjacent rectangular units of the driving sources 171A and 171B to cause adjacent rectangular beams to warp in opposite vertical directions, and the accumulation of the vertical movement of the adjacent rectangular beams is transmitted to the movable frame 160. With the above mechanism, the second driving beams 170A and 170B causes the mirror 110 in a vertical direction that is orthogonal to the horizontal direction. For example, nonresonant oscillation may be used for vertical driving by the second driving beams 170A and 170B.

Here, it is assumed that the driving source 171B includes driving sources 171DL, 171CL, 171BL, and 171AL arranged from the left side toward the movable frame 160, and the driving source 171A includes driving sources 171AR, 171BR, 171CR, and 171DR arranged from the movable frame 160 toward the right side. In this case, the mirror 110 can be caused to oscillate in the vertical direction by driving the driving sources 171Ax and 171Cx (four driving sources) with the same waveform (first waveform) and driving the driving sources 171Bx and 171Dx (four driving sources) with the same waveform (second waveform) whose phase is different from the phase of the first waveform.

Drive wires for applying driving voltages to the upper electrode and the lower electrode of the driving source 151A are connected to the corresponding terminals of a terminal group TA provided on the fixed frame 180. Drive wires for applying driving voltages to the upper electrode and the lower electrode of the driving source 151B are connected to the corresponding terminals of the terminal group TA provided on the fixed frame 180. Drive wires for applying driving voltages to the upper electrodes and the lower electrodes of the driving source 171A are connected to the corresponding terminals of the terminal group TA provided on the fixed frame 180. Drive wires for applying driving voltages to the upper electrodes and the lower electrodes of the driving source 171B are connected to the corresponding terminals of a terminal group TB provided on the fixed frame 180.

The optical scanning device 200 also includes piezoelectric sensors 191 and 192 that detect a horizontal tilt angle of the mirror 110 while driving voltages are being applied to the driving sources 151A and 151B and the mirror 110 are oscillating in the horizontal direction. The piezoelectric sensors 191 and 192 are provided on the coupling beam 140B. In the present embodiment, the piezoelectric sensor 192 is a dummy sensor for balancing the weights of the coupling beams 140A and 140B.

The optical scanning device 200 further includes piezoelectric sensors 195 and 196 that detect a vertical tilt angle of the mirror 110 while driving voltages are being applied to the driving sources 171A and 171B and the mirror 110 are oscillating in the vertical direction. The piezoelectric sensor 195 is provided on one of the rectangular beams of the second driving beam 170A, and the piezoelectric sensor 196 is provided on one of the rectangular beams of the second driving beam 170B.

The piezoelectric sensor 191 outputs a current value that varies depending on the tilt angle of the mirror 110 in the horizontal direction and corresponds to the displacement of the coupling beam 140B caused by the torsion beam 130B. The piezoelectric sensor 195 outputs a current value that varies depending on the vertical tilt angle of the mirror 110 and corresponds to the displacement of the rectangular beam of the second driving beam 170A on which the piezoelectric sensor 195 is provided. The piezoelectric sensor 196 outputs a current value that varies depending on the vertical tilt angle of the mirror 110 and corresponds to the displacement of the rectangular beam of the second driving beam 170B on which the piezoelectric sensor 196 is provided.

In the present embodiment, the horizontal tilt angle of the mirror 110 is detected based on an output from the piezoelectric sensor 191. Also in the present embodiment, the vertical tilt angle of the mirror 110 is detected based on outputs from the piezoelectric sensors 195 and 196. A tilt detection unit for detecting tilt angles of the mirror 110 based on current values output from the piezoelectric sensors 191, 195, and 196 may be provided outside of the optical scanning device 200. Also, a drive control unit for controlling driving voltages to be applied to the driving sources 151A, 151B, 171A, and 171B based on detection results of the tilt detection unit may be provided outside of the optical scanning device 200.

Each of the piezoelectric sensors 191, 195, and 196 includes an upper electrode formed on an upper surface of a thin film of a piezoelectric element and a lower electrode formed on a lower surface of the piezoelectric element. In the present embodiment, each of the piezoelectric sensors 191, 195, and 196 outputs a current value of sensor wires connected to the upper electrode and the lower electrode.

The sensor wires extending from the upper electrode and the lower electrode of the piezoelectric sensor 191 are connected to the corresponding terminals of the terminal group TB provided on the fixed frame 180. The sensor wires extending from the upper electrode and the lower electrode of the piezoelectric sensor 195 are connected to the corresponding terminals of the terminal group TA provided on the fixed frame 180. The sensor wires extending from the upper electrode and the lower electrode of the piezoelectric sensor 196 are connected to the corresponding terminals of the terminal group TB provided on the fixed frame 180.

Figure 2:
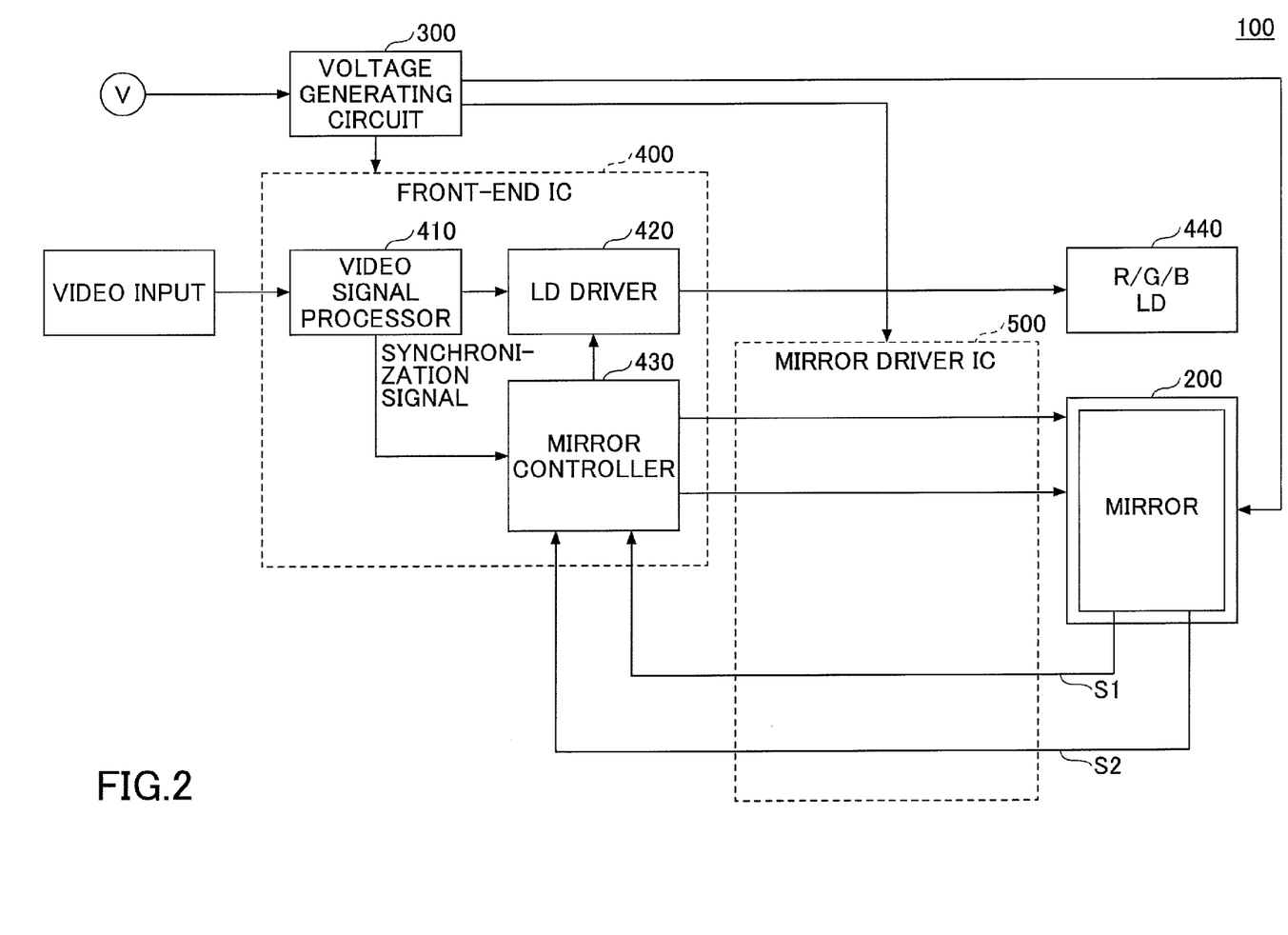
FIG. 2 is a drawing illustrating an exemplary configuration of an optical scanning unit according to an embodiment.

FIG. 2 is a drawing illustrating an exemplary configuration of an optical scanning unit 100 according to an embodiment. Referring to FIG. 2, the optical scanning unit 100 includes the optical scanning device 200, a voltage generating circuit 300, a frontend integrated circuit (IC) 400, a laser diode (LD) 440, and a mirror driver IC 500. The voltage generating circuit 300, the frontend IC 400, the LD 440, and the mirror driver IC 500 constitute an optical scanning control device for controlling the optical scanning device 200.

The voltage generating circuit 300 supplies power to the components of the optical scanning unit 100. The frontend IC 400 performs predetermined signal processing on an input video signal, and supplies resulting signals to the LD 440. Also, the frontend IC 400 supplies a control signal for controlling the oscillation of the mirror 110 via the mirror driver IC 500 to the optical scanning device 200. The frontend IC 400 includes a video signal processor 410, an LD driver 420, and a mirror controller 430.

The video signal processor 410 separates a synchronization signal, a luminance signal, and a chrominance signal included in an input video signal. The video signal processor 410 supplies the luminance signal and the chrominance signal to the LD driver 420, and supplies the synchronization signal to the mirror controller 430. The LD driver 420 controls the LD 440 based on the luminance signal and the chrominance signal output from the video signal processor 410.

The mirror controller 430 receives, via the mirror driver IC 500, an output S1 of the piezoelectric sensor 191 and outputs S2 of the piezoelectric sensors 195 and 196 of the optical scanning device 200. Based on the outputs S1 and S2 input from the mirror driver IC 500 and the synchronization signal, the mirror controller 430 controls the oscillation of the mirror 110. More specifically, the mirror controller 430 outputs, via the mirror driver IC 500, driving voltages (which are hereafter referred to as "driving signals") for driving the driving sources 151A, 151B, 171A, and 171B of the optical scanning device 200.

Figure 3:
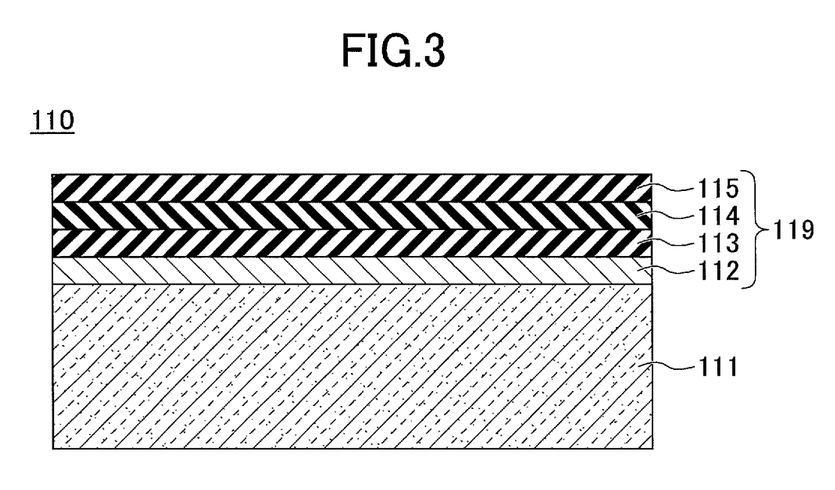
FIG. 3 is a drawing illustrating an exemplary layer structure of a mirror.

An exemplary layer structure of the mirror 110 of the optical scanning device 200 is described below. FIG. 3 is a drawing illustrating an exemplary layer structure of the mirror 110. Referring to FIG. 3, the mirror 110 includes a substrate 111 and a multilayer film 119. The multilayer film 119 includes a metal film 112, a low-refractive index film 113, a high-refractive index film 114, and a protective film 115. The protective film 115 may be omitted.

The substrate 111 is a base on which the metal film 112 is formed, and may include, for example, silicon (Si). The thickness of the substrate 111 is, for example, from several tens to several hundred μm.

The metal film 112 is formed on an upper surface of the substrate 111 by, for example, sputtering. The metal film 112 is preferably made of a metal material having a high reflectance in a visible light range (which hereafter indicates a range of wavelengths greater than or equal to 400 nm and less than or equal to 700 nm), i.e., a range of wavelengths of light to be reflected by the mirror 110. Examples of materials of the metal film 112 include pure silver (Ag) and a silver alloy. The thickness of the metal film 112 is, for example, 200 nm.

The low-refractive index film 113 is formed on an upper surface of the metal film 112 by, for example, atomic layer deposition (ALD). The low-refractive index film 113 and the high-refractive index film 114 form a dielectric multilayer film. The dielectric multilayer film functions as a reflection enhancing film that increases the reflectance in a low wavelength range (which hereafter indicates a range of wavelengths less than 550 nm) within the visible light range. For this reason, the low-refractive index film 113 is preferably made of a material whose refractive index is greatly different from that of the high-refractive index film 114.

Examples of materials of the low-refractive index film 113 include alumina ($Al_2O_3$), silicon dioxide ($SiO_2$), and magnesium fluoride (MgF). The refractive index of alumina ($Al_2O_3$) is about 1.7, the refractive index of silicon dioxide ($SiO_2$) is about 1.4, and the refractive index of magnesium fluoride (MgF) is about 1.4. The thickness (optical film thickness) of the low-refractive index film 113 is, for example, about 0.51×λ/4 (λ=550 nm).

The high-refractive index film 114 is formed on an upper surface of the low-refractive index film 113 by, for example, atomic layer deposition (ALD). The high-refractive index film 114 and the low-refractive index film 113 form a dielectric multilayer film. The dielectric multilayer film functions as a reflection enhancing film that improves the reflectance in the low wavelength range within the visible light range. For this reason, the high-refractive index film 114 is preferably made of a material whose refractive index is greatly different from that of the low-refractive index film 113.

Examples of materials of the high-refractive index film 114 include titanium oxide ($TiO_2$), tantalum oxide ($Ta_2O_3$), zirconium oxide ($ZrO_2$), hafnium oxide ($HfO_2$), and yttrium oxide ($Y_2O_3$). The refractive indices of these elements are about 2.0 to 2.4. The thickness (optical film thickness) of the high-refractive index film 114 is, for example, about 0.82×λ/4 (λ=550 nm).

The protective film 115 is formed on an upper surface of the high-refractive index film 114 by, for example, atomic layer deposition (ALD). The protective film 115 prevents the refractive index of the high-refractive index film 114 from changing due to, for example, temperature and humidity changes. When such a problem does not likely occur, the protective film 115 may be omitted.

Examples of materials of the protective film 115 include alumina ($Al_2O_3$) and silicon dioxide ($SiO_2$). The thickness (optical film thickness) of the protective film 115 is, for example, about 0.25×λ/4 (λ=550 nm).

Thus, according to the present embodiment, the mirror 110 is formed by stacking the metal film 112 having a high reflectance in a visible light range on the substrate 111, and stacking the low-refractive index film 113 and the high-refractive index film 114 that function as a reflection enhancing film on the metal film 112. This configuration makes it possible to increase the reflectance in the low wavelength range within the visible light range and reduce the incident angle dependence of reflectance in the visible light range.

Because there is a case where incident light is p-polarized light and a case where incident light is s-polarized light, the mirror 110 is preferably configured such that the reflectance in the low wavelength range within the visible light range can be increased and the incident angle dependence of reflectance in the visible light range can be reduced in both of the cases.

The multilayer film 119 may also have a configuration where the metal film 112, the high-refractive index film 114, the low-refractive index film 113, and the protective film 115 are stacked in this order. This configuration also provides advantageous effects similar to those described above. In other words, the low-refractive index film 113 and the high-refractive index film 114 may be stacked in a reverse order. However, the adherence of the material of the high-refractive index film 114 such as titanium oxide ($TiO_2$) to the metal film 112 is not high. On the other hand, the adherence of the material of the low-refractive index film 113 such as alumina ($Al_2O_3$) to the metal film 112 is high. Accordingly, when the adherence of a material to the metal film 112 is taken into account, the multilayer film 119 is preferably formed by stacking the metal film 112, the low-refractive index film 113, the high-refractive index film 114, and the protective film 115 is this order.

First Example

In a first example, the multilayer film 119 illustrated by FIG. 3 was prepared, and the reflectance and the incident angle dependence of reflectance of the multilayer film 119 were evaluated for each of p-polarized light and s-polarized light. The incident angle of light was set at 5 degrees, 30 degrees, and 50 degrees.

Here, the incident angle indicates an angle of incidence of a laser beam with respect to a normal of the uppermost surface of the multilayer film 119 when the mirror 110 is in the initial state (where the mirror 110 is not being caused to oscillate). That is, when the laser beam enters the multilayer film 119 in the direction of the normal of the uppermost surface of the multilayer film 119, the incident angle is 0 degrees. When the mirror 110 oscillates (e.g., about ±10 degrees), the incident angle changes.

The layer structure of the multilayer film 119 prepared in the first example is described below. Silicon (Si) was used as the material of the substrate 111. As the metal film 112, a film of pure silver (Ag) with a thickness of about 200 nm was formed by sputtering. As the low-refractive index film 113, a film of alumina ($Al_2O_3$) with an optical film thickness of 0.51×λ/4 (λ=550 nm)=about 40 nm was formed by atomic layer deposition (ALD). As the high-refractive index film 114, a film of titanium oxide ($TiO_2$) with an optical film thickness of 0.82×λ/4 (λ=550 nm)=about 47 nm was formed by atomic layer deposition (ALD). As the protective film 115, a film of alumina ($Al_2O_3$) with an optical film thickness of 0.25×λ/4 (λ=550 nm)=about 20 nm was formed by atomic layer deposition (ALD).

Also, as a comparative example, a sample was prepared by forming only a metal film on a silicon substrate, and the sample was evaluated in the same manner as in the first example. As the metal film, a film of pure silver (Ag) with a thickness of about 200 nm was formed by sputtering. The metal film (pure silver film) of the comparative example is a single layer formed on the silicon substrate, and no layer is formed on the metal film.

Figure 4:
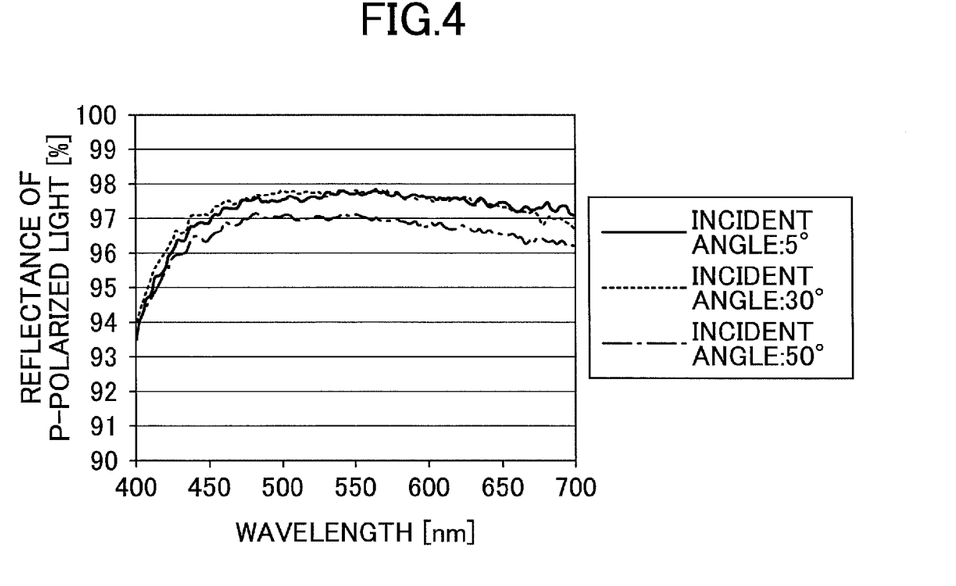
FIG. 4 is a graph illustrating the incident angle dependence of reflectance (p-polarized light) of a multilayer film of a first example.
Figure 5:
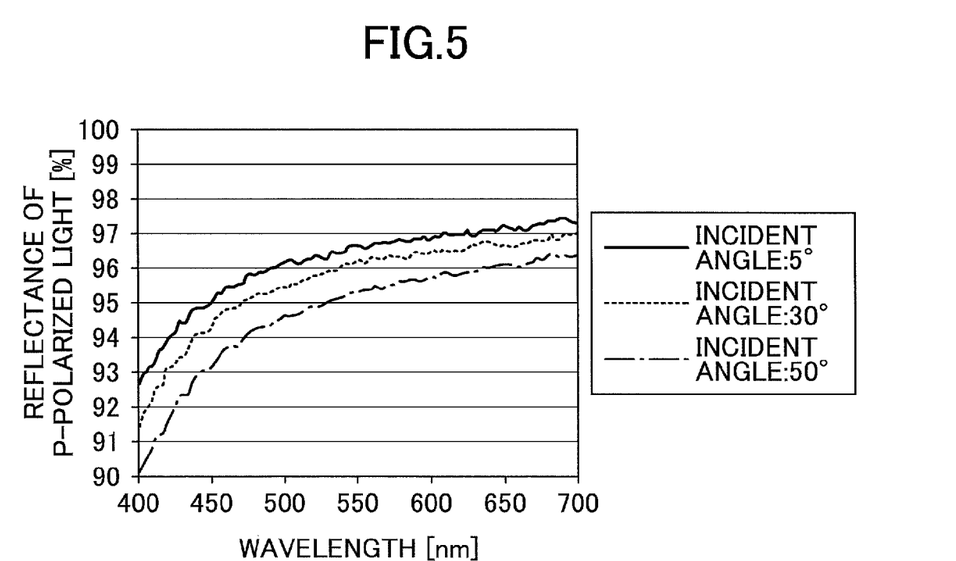
FIG. 5 is a graph illustrating the incident angle dependence of reflectance (p-polarized light) of a metal film of a comparative example.

Evaluation results are described below with reference to FIGS. 4 through 9. FIG. 4 is a graph illustrating the incident angle dependence of reflectance (p-polarized light) of the multilayer film 119 of the first example. FIG. 5 is a graph illustrating the incident angle dependence of reflectance (p-polarized light) of the metal film of the comparative example. Referring to FIGS. 4 and 5, for all of the incident angles of the p-polarized light, the reflectance of the multilayer film 119 of the first example is greater than the reflectance of the metal film of the comparative example in the low wavelength range within the visible light range. Also, the incident angle dependence of reflectance of the multilayer film 119 for the p-polarized light is smaller than that of the metal film of the comparative example particularly in the low wavelength range within the visible light range.

Figure 6:
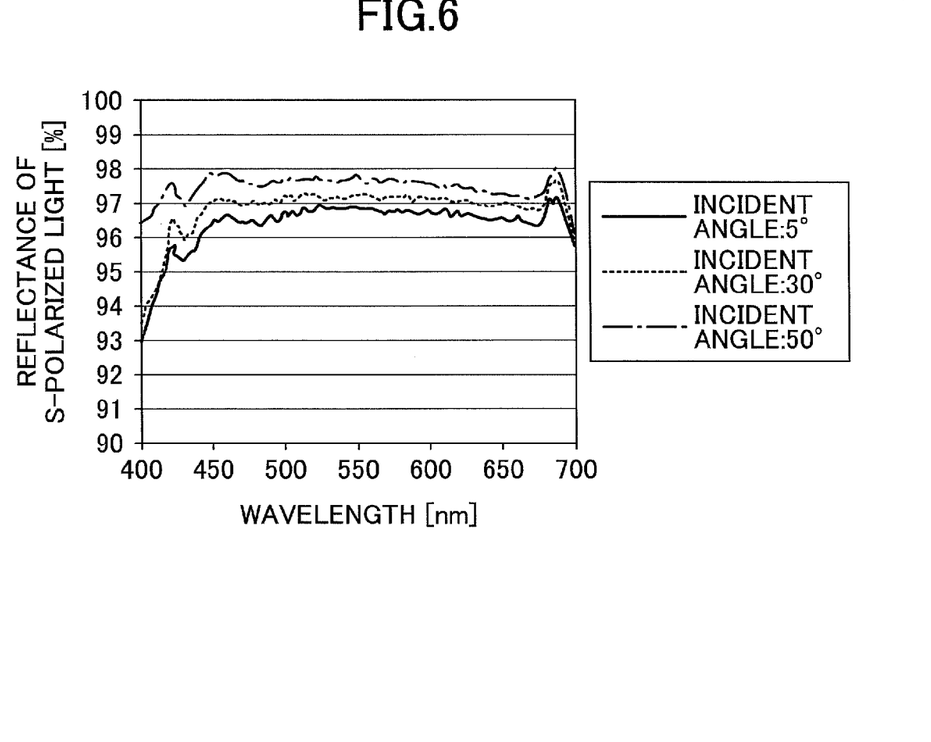
FIG. 6 is a graph illustrating the incident angle dependence of reflectance (s-polarized light) of a multilayer film of the first example.
Figure 7:
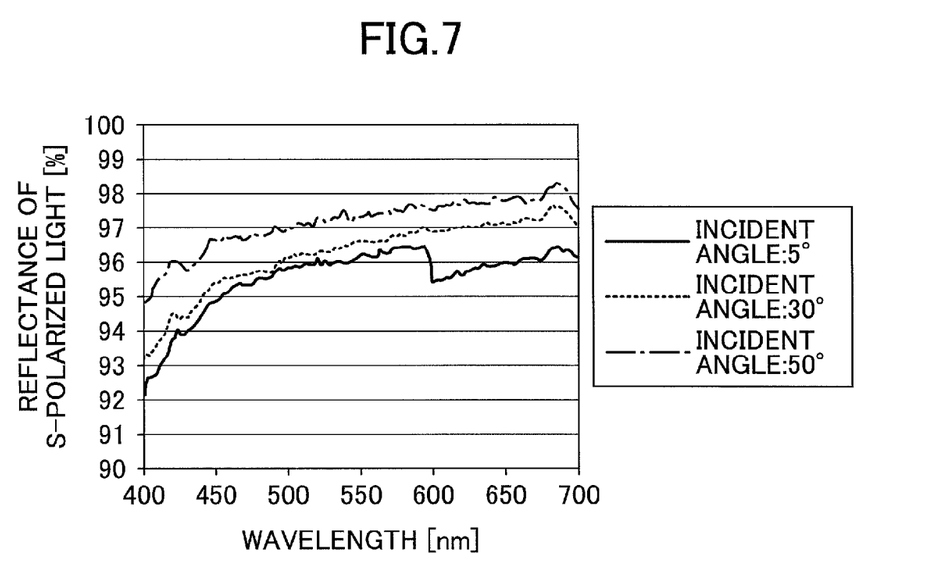
FIG. 7 is a graph illustrating the incident angle dependence of reflectance (s-polarized light) of a metal film of the comparative example.

FIG. 6 is a graph illustrating the incident angle dependence of reflectance (s-polarized light) of the multilayer film 119 of the first example. FIG. 7 is a graph illustrating the incident angle dependence of reflectance (s-polarized light) of the metal film of the comparative example. Referring to FIGS. 6 and 7, for all of the incident angles of the s-polarized light, the reflectance of the multilayer film 119 of the first example is greater than the reflectance of the metal film of the comparative example in the low wavelength range within the visible light range. Also, the incident angle dependence of reflectance of the multilayer film 119 for the s-polarized light is smaller than that of the metal film of the comparative example particularly in a high wavelength range (which hereafter indicates a range of wavelengths greater than 550 nm) within the visible light range.

Figure 8:
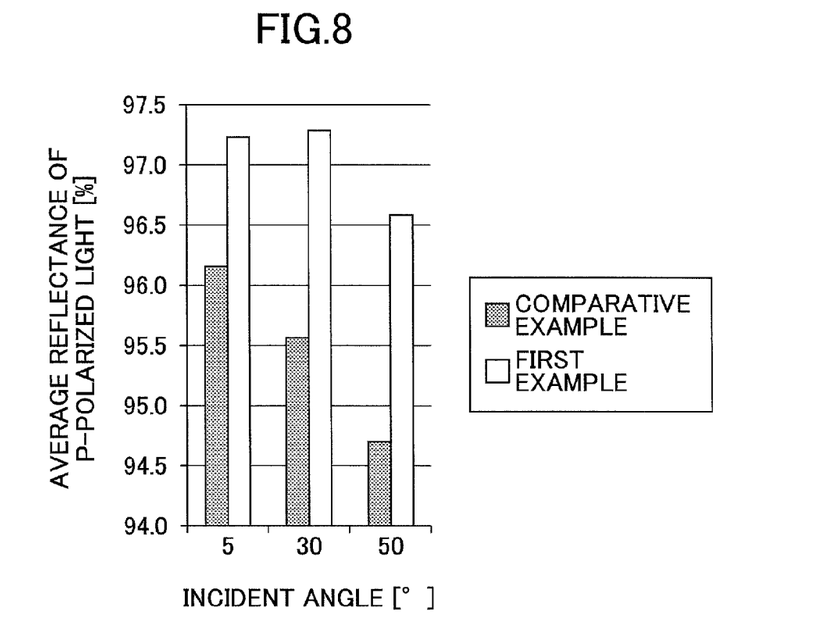
FIG. 8 is a graph comparing the incident angle dependence of average reflectance in the first example and the incident angle dependence of average reflectance in the comparative example (p-polarized light)
Figure 9:
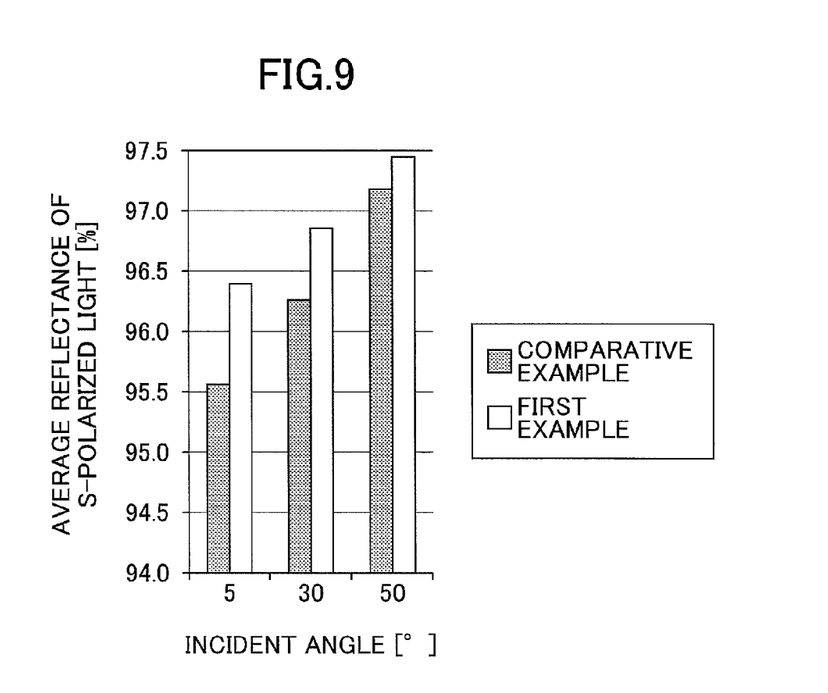
FIG. 9 is a graph comparing the incident angle dependence of average reflectance in the first example and the incident angle dependence of average reflectance in the comparative example (s-polarized light)

FIG. 8 is a graph comparing the incident angle dependence of average reflectance in the first example and the incident angle dependence of average reflectance in the comparative example (p-polarized light). FIG. 9 is a graph comparing the incident angle dependence of average reflectance in the first example and the incident angle dependence of average reflectance in the comparative example (s-polarized light). Here, the average reflectance indicates an average of reflectance measurements for all wavelengths in the entire visible light range. As illustrated by FIG. 8, for all of the incident angles of the p-polarized light in the visible light range, the average reflectance of the multilayer film 119 of the first example is greater than the average reflectance of the metal film of the comparative example. Also, as illustrated by FIG. 9, for all of the incident angles of the s-polarized light in the visible light range, the average reflectance of the multilayer film 119 of the first example is greater than the average reflectance of the metal film of the comparative example.

Thus, the average reflectance of the multilayer film 119 of the first example is greater than the average reflectance of the metal film of the comparative example for all of the incident angles of the p-polarized light and the s-polarized light in the visible light range, and the reflectance of the multilayer film 119 is greater than the reflectance of the metal film of the comparative example particularly in the low-wavelength range within the visible light range. Also, the incident angle dependence of reflectance of the multilayer film 119 for the p-polarized light is smaller than that of the metal film of the comparative example particularly in the low wavelength range within the visible light range, and the incident angle dependence of reflectance of the multilayer film 119 for the s-polarized light is smaller than that of the metal film of the comparative example particularly in the high wavelength range within the visible light range.

Second Example

In a second example, an experiment was conducted to find out a preferable thickness of the high-refractive index film 114 made of titanium oxide ($TiO_2$). In the second example, the multilayer film 119 was prepared in a manner similar to that in the first example. In the second example, however, five different samples of the multilayer film 119 were prepared by setting the optical film thickness of the high-refractive index film 114 made of titanium oxide ($TiO_2$) at about 17 nm, about 27 nm, about 37 nm, about 47 nm, and about 57 nm, respectively. Then, the dependence of reflectance of the multilayer film 119 on the film thickness of the high-refractive index film 114 was evaluated for each of p-polarized light and s-polarized light. The incident angle of light was set at 5 degrees and 50 degrees.

Figure 10:
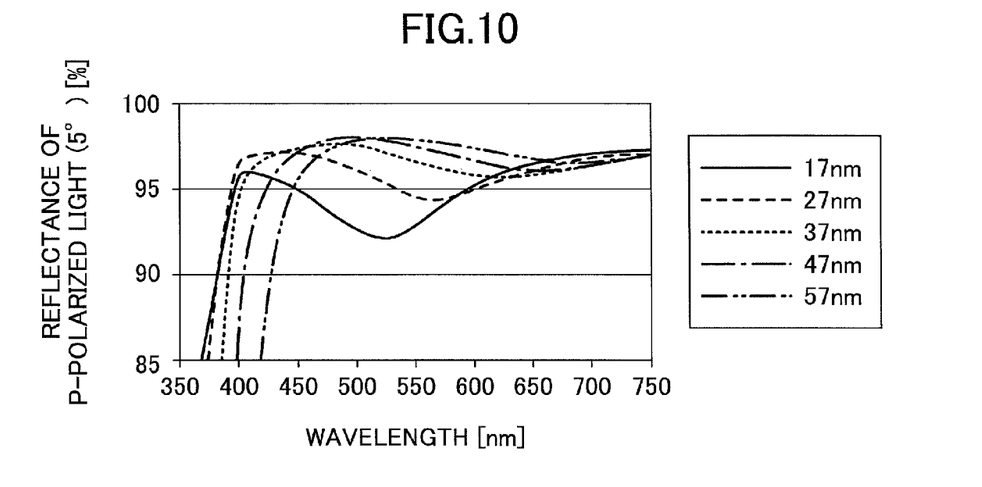
FIG. 10 is a graph illustrating the dependence of reflectance (p-polarized light, incident angle of 5 degrees) of a multilayer film of a second example on the film thickness of a high-refractive index film.
Figure 11:
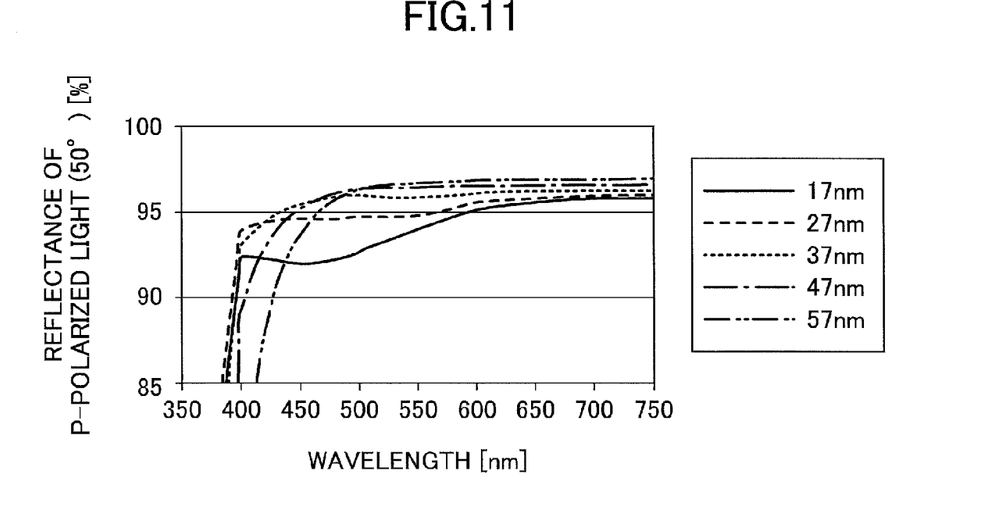
FIG. 11 is a graph illustrating the dependence of reflectance (p-polarized light, incident angle of 50 degrees) of a multilayer film of the second example on the film thickness of a high-refractive index film.
Figure 12:
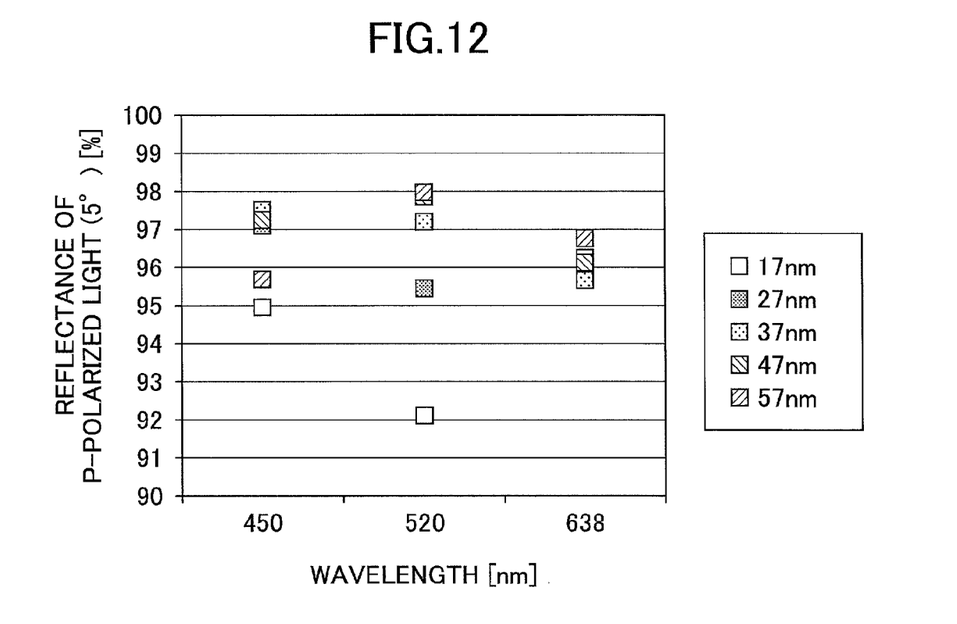
FIG. 12 is a graph that plots values extracted from FIG. 10 and corresponding to selected wavelengths.
Figure 13:
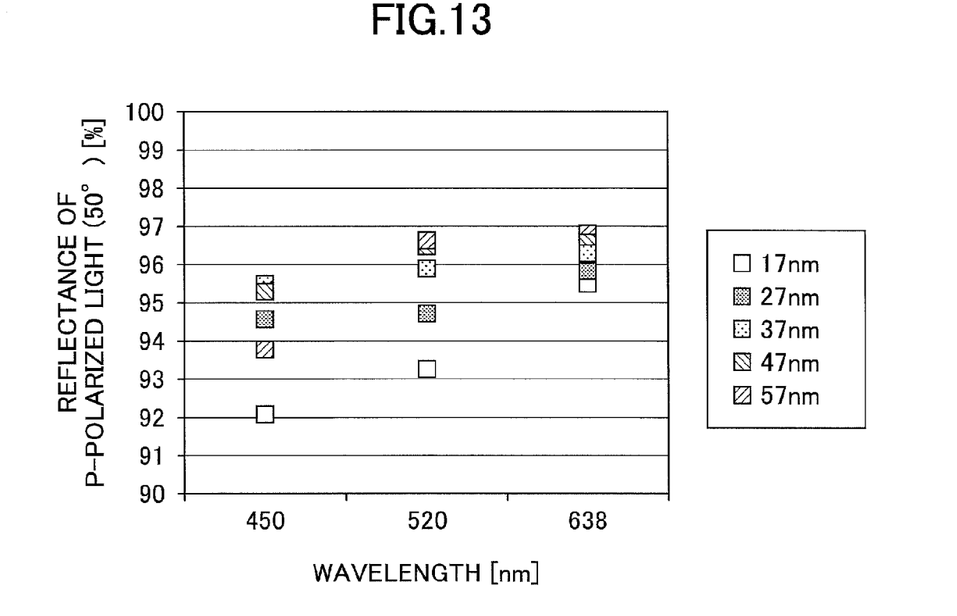
FIG. 13 is a graph that plots values extracted from FIG. 11 and corresponding to selected wavelengths.

Evaluation results are described below with reference to FIGS. 10 through 17. FIG. 10 is a graph illustrating the dependence of reflectance (p-polarized light, incident angle of 5 degrees) of the multilayer film 119 of the second example on the film thickness of the high-refractive index film 114. FIG. 11 is a graph illustrating the dependence of reflectance (p-polarized light, incident angle of 50 degrees) of the multilayer film 119 of the second example on the film thickness of the high-refractive index film 114. FIGS. 12 and 13 are graphs that plot values extracted from FIGS. 10 and 11 and corresponding to selected wavelengths. In FIGS. 12 and 13, wavelengths of 450 nm (B), 520 nm (G), and 638 nm (R) typically used for laser projection are selected.

As illustrated by FIGS. 10 through 13, regardless of the incident angles, the reflectance of the multilayer film 119 for the p-polarized light in a particular wavelength range decreases as the film thickness of the high-refractive index film 114 decreases, and a high-reflectance range (e.g., a range where the reflectance is greater than or equal to 90%) for the p-polarized light shifts toward the longer-wavelength side as the film thickness of the high-refractive index film 114 increases.

Figure 14:
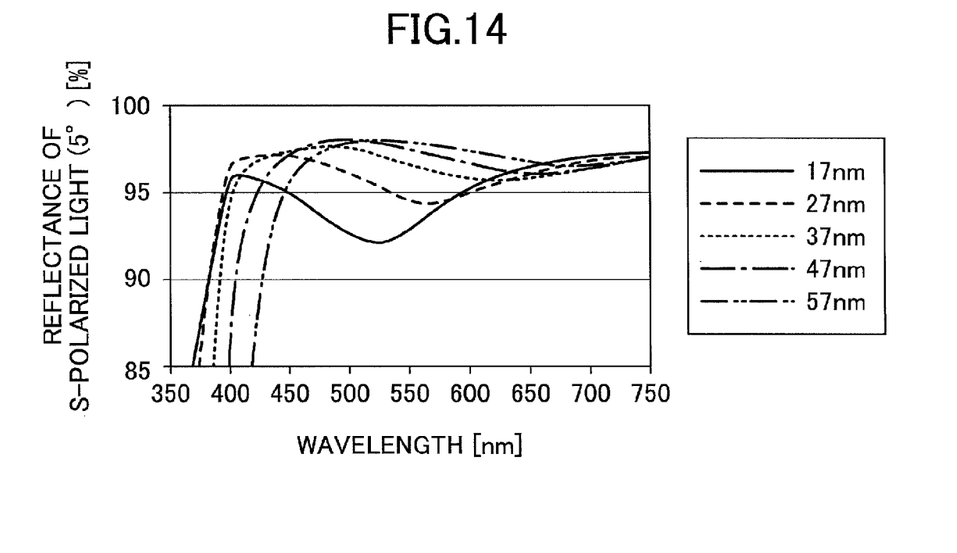
FIG. 14 is a graph illustrating the dependence of reflectance (s-polarized light, incident angle of 5 degrees) of a multilayer film of the second example on the film thickness of a high-refractive index film.
Figure 15:
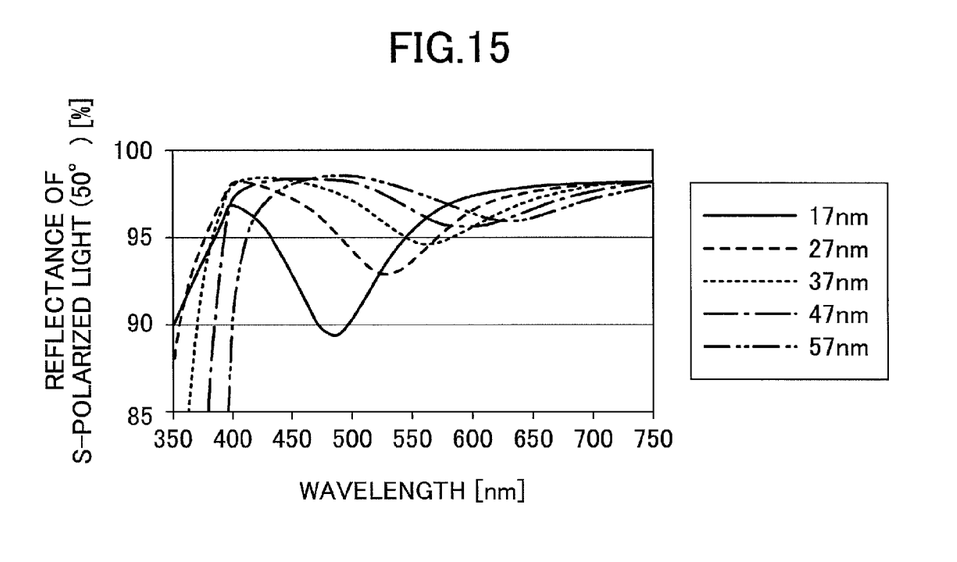
FIG. 15 is a graph illustrating the dependence of reflectance (s-polarized light, incident angle of 50 degrees) of a multilayer film of the second example on the film thickness of a high-refractive index film.
Figure 16:
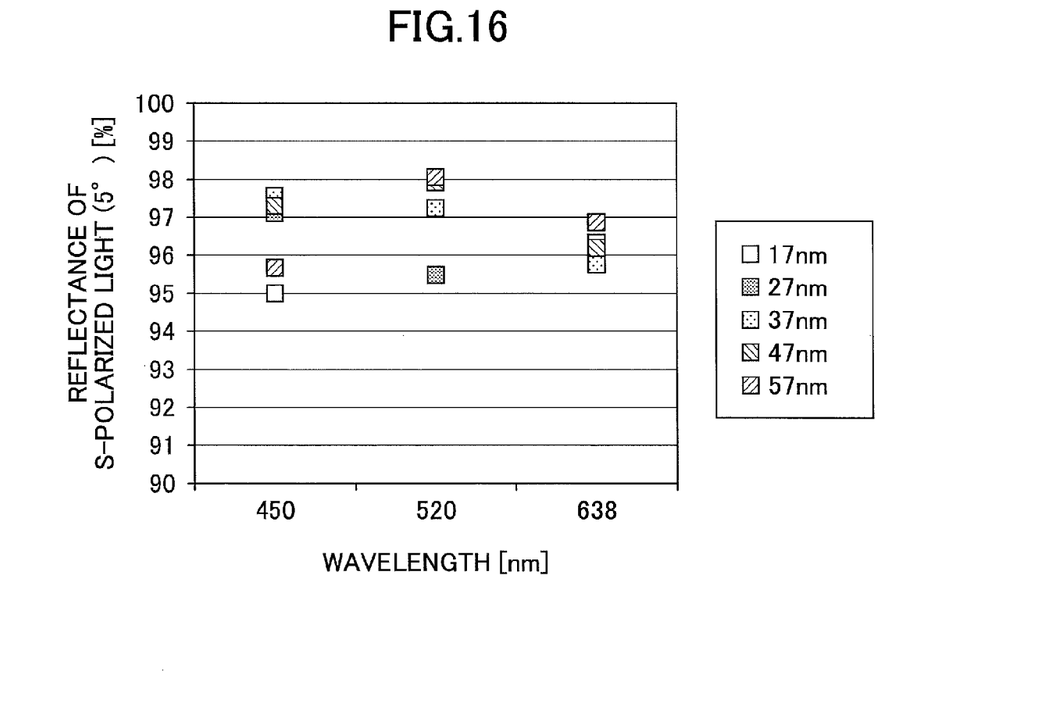
FIG. 16 is a graph that plots values extracted from FIG. 14 and corresponding to selected wavelengths.
Figure 17:
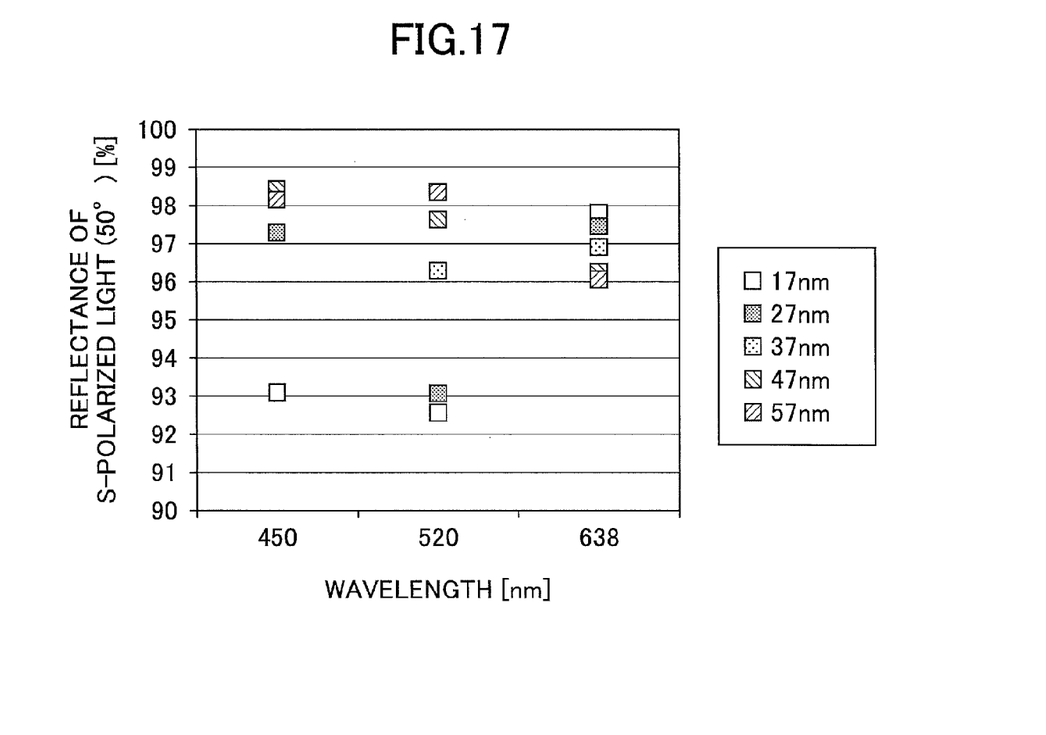
FIG. 17 is a graph that plots values extracted from FIG. 15 and corresponding to selected wavelengths.

FIG. 14 is a graph illustrating the dependence of reflectance (s-polarized light, incident angle of 5 degrees) of the multilayer film 119 of the second example on the film thickness of the high-refractive index film 114. FIG. 15 is a graph illustrating the dependence of reflectance (s-polarized light, incident angle of 50 degrees) of the multilayer film 119 of the second example on the film thickness of the high-refractive index film 114. FIGS. 16 and 17 are graphs that plot values extracted from FIGS. 14 and 15 and corresponding to selected wavelengths (the same wavelengths as in FIGS. 12 and 13).

As illustrated by FIGS. 14 through 17, regardless of the incident angles, the reflectance of the multilayer film 119 for the s-polarized light in a particular wavelength range decreases as the film thickness of the high-refractive index film 114 decreases, and a high-reflectance range (e.g., a range where the reflectance is greater than or equal to 90%) for the s-polarized light shifts toward the longer-wavelength side as the film thickness of the high-refractive index film 114 increases.

Judging from data illustrated by FIGS. 10 through 17 with the focus on the three wavelengths of 450 nm (B), 520 nm (G), and 638 nm (R), for each of the p-polarized light and the s-polarized light, a high reflectance can be achieved in a given incident angle range when the film thickness of the high-refractive index film 114 is greater than or equal to 47 nm and less than or equal to 57 nm.

As described above, the mirror 110 of the present embodiment is formed by stacking the metal film 112 with a high reflectance in the visible light range on the substrate 111 and stacking the low-refractive index film 113 and the high-refractive index film 114 that function as a reflection enhancing film on the metal film 112. This configuration makes it possible to increase the reflectance in the low wavelength range within the visible light range and reduce the incident angle dependence of reflectance in the visible light range for both of the p-polarized light and the s-polarized light. Using the mirror 110 with improved reflectance makes it possible to reduce the intensity of a laser beam incident on the mirror 110 and reduce the power consumed by, for example, an LD driver.

The multilayer film 119 of the present embodiment can be formed by a small number of layers. This in turn makes it possible to reduce the total thickness of the multilayer film 119. Also, reducing the total thickness of the multilayer film 119 makes it possible to reduce the risk that the substrate 111 is deformed. Nevertheless, multiple pairs of the low-refractive index film 113 and the high-refractive index film 114 may be stacked as long as the substrate 111 is not deformed.

An aspect of this disclosure provides an optical scanning device including a mirror that includes a multilayer film having a film configuration determined taking into account the incident angle dependence of reflectance, and an optical scanning unit including the optical scanning device.

An optical scanning device and an optical scanning unit including the optical scanning device according to the embodiment of the present invention are described above. However, the present invention is not limited to the specifically disclosed embodiment, and variations and modifications may be made without departing from the scope of the present invention.

What is claimed is:
1. An optical scanning device, comprising:
   a mirror that oscillates to scan incident visible light, wherein the mirror includes:
a substrate, and
a multi-layer film that reflects the visible light, said multi-layer film including a metal film formed on the substrate, and a reflection enhancing film stacked on the metal film.

2. The optical scanning device as claimed in claim 1, wherein the reflection enhancing film includes a low-refractive index film stacked on the metal film and a high-refractive index film stacked on the low-refractive index film.

3. The optical scanning device as claimed in claim 1, wherein the metal film includes silver.

4. The optical scanning device as claimed in claim 2, wherein the low-refractive index film includes alumina, and the high-refractive index film includes titanium oxide.

5. The optical scanning device as claimed in claim 2, wherein the mirror further includes a protective film stacked on the high-refractive index film.

6. The optical scanning device as claimed in claim 5, wherein the protective film includes alumina.

7. The optical scanning device as claimed in claim 1, wherein the reflection enhancing film is adapted for a laser beam with a wavelength greater than or equal to 400 nm and less than or equal to 700 nm.

8. The optical scanning device as claimed in claim 1, wherein when an incident angle of 0 degrees is an angle of light entering an uppermost surface of the reflection enhancing film in a direction of a normal of the uppermost surface, the reflection enhancing film is adapted for the visible light whose incident angle is greater than 0 degrees and less than 50 degrees.

9. An optical scanning device, comprising:
a mirror that reflects a laser beam having a wavelength in a predetermined range and entering the mirror at an incident angle in a predetermined range; and
an actuator that causes the mirror to oscillate vertically or horizontally to scan the laser beam,
wherein the mirror includes a substrate, a metal film formed on the substrate, and a reflection enhancing film stacked on the metal film; and
wherein the reflection enhancing film is a dielectric multi-layer film including a low-refractive index film stacked on the metal film and a high-refractive index film stacked on the low-refractive index film.

10. The optical scanning device as claimed in claim 9, wherein the metal film includes silver.

11. The optical scanning device as claimed in claim 9, wherein the low-refractive index film includes alumina, and the high-refractive index film includes titanium oxide.

12. The optical scanning device as claimed in claim 9, wherein the mirror further includes a protective film stacked on the high-refractive index film.

13. The optical scanning device as claimed in claim 12, wherein the protective film includes alumina.

14. The optical scanning device as claimed in claim 9, wherein the reflection enhancing film is adapted for the laser beam that has a wavelength greater than or equal to 400 nm and less than or equal to 700 nm.

15. The optical scanning device as claimed in claim 9, wherein when an incident angle of 0 degrees is an angle of light entering an uppermost surface of the reflection enhancing film in a direction of a normal of the uppermost surface, the reflection enhancing film is adapted for the laser beam whose incident angle is greater than 0 degrees and less than 50 degrees.

16. An optical scanning unit, comprising:
the optical scanning device of claim 1;
a mirror controller that controls vertical or horizontal oscillation of the mirror; and
a driver that drives an actuator for causing the mirror to oscillate according to a control signal from the mirror controller.

17. An optical scanning unit, comprising:
the optical scanning device of claim 9;
a mirror controller that controls vertical or horizontal oscillation of the mirror; and
a driver that drives the actuator according to a control signal from the mirror controller.

* * * * *